United States Patent [19]
Gray

[11] 3,958,607
[45] May 25, 1976

[54] APPARATUS FOR SEALING PIPE LEAKS

[75] Inventor: Sam L. Gray, Salt Lake City, Utah

[73] Assignee: The Penetryn System, Inc., Winter Park, Fla.

[22] Filed: Aug. 29, 1974

[21] Appl. No.: 501,853

[52] U.S. Cl. .................................... 138/97; 138/93
[51] Int. Cl.² .......................................... F16L 55/18
[58] Field of Search ................................ 138/97, 93

[56] References Cited
UNITED STATES PATENTS

| | | |
|---|---|---|
| 1,221,733 | 4/1917 | Henderson ..................... 138/93 X |
| 2,279,257 | 4/1942 | Svirsky ............................ 138/93 |
| 3,103,235 | 9/1963 | Stringham ..................... 138/93 X |
| 3,618,639 | 11/1971 | Daley et al. ..................... 138/97 |
| 3,796,233 | 3/1974 | Lacey ............................. 138/97 |
| 3,834,422 | 9/1974 | Larson ........................... 138/97 |
| 3,902,528 | 9/1975 | Tartabini et al. ............. 138/93 X |

FOREIGN PATENTS OR APPLICATIONS 142,419  1920  United Kingdom ................. 138/97

Primary Examiner—Richard C. Queisser
Assistant Examiner—Charles Gorenstein
Attorney, Agent, or Firm—Duckworth, Hobby & Allen

[57] ABSTRACT

Pipe leak method and apparatus are provided in which the apparatus includes a pair of inflatable sleeves having each end of each sleeve sealed and connected by a flexible connection in spaced relationship to each other. One sleeve has a fluid connection for directing air thereinto for inflating the sleeve and a connection between the sleeves allows both sleeves to be inflated simultaneously from a remote location. A chemical line is connected through one sleeve to a space between the sleeves for directing several chemicals into the space when the sleeves are inflated in a pipe to seal a leak in the pipe between the inflated sleeves. The method has a TV camera located in a sewer line adjacent to a connection with a second sewer line so that the operator can remotely view the intersection to determine if fluids infiltrating the second line are flowing into the intersection. The packer is inserted into the second pipe and inflated at a plurality of locations along the pipe to determine which location stops or reduces the flow of fluid into the intersection being observed with the TV camera, then repairing the located leak with the packer apparatus.

4 Claims, 5 Drawing Figures

APPARATUS FOR SEALING PIPE LEAKS

BACKGROUND OF THE INVENTION

Field of the Invention

The present invention relates to the internal sealing of pipe leaks and especially to sleeve type packers for use with fast setting chemical grouts. The present packer apparatus and method is especially adapted for use in those systems in which a television camera in a waterproof housing may be pulled through a sewer line to detect leaks in the sewer pipe and assist in positioning the packer for sealing of the leak by remote control from a mobile unit located near an access to the sewer line.

Sewer pipes frequently develop leaks at the joints between sections of the pipe. Prior to the development of television cameras and internal pipe sealing equipment, the repair of subterranean pipe lines to correct the infiltration of water or the exfiltration of sewage had been to excavate along the pipe to locate the leak and repair the pipe. This, however, was time consuming and expensive or it was difficult to locate the exact site of a leak in the pipe. This resulted in experimentations for better ways of locating leaking joints and resulted in waterproof cameras such as TV cameras having lighting for pulling through the pipe line to examine the interior of the pipe line for leaks and structural damage. Once a fault or leak was located with a camera, a hole could be drilled to a spot near the leak and sealing material fed through conduits could repair the leak. This particular method and apparatus was described in the claims in U.S. Pat. No. 2,917,259 entitled METHOD AND APPARATUS FOR DETERMINING THE POSITION OF SEWER LEAKS, by Robert F. Hanau and Edward D. Toole and assigned to the assignee of the present invention. The next step in the evolution of repairing sewer lines involved the development of a mechanism for internally sealing a pipe leak having a packer movable within a pipe along its length for injecting a plugging material into the leak. Such a packer was described in U.S. Pat. No. 3,168,908 for a mechanism for the internal sealing of pipe leaks by James A. Zurbrigen and Jack C. Steinsberger and assigned to the assignee of the present invention. This type of sealing packer was used in association with an enclosed television camera to provide a method for sealing and repairing internal leaks in sewer lines by moving the packer along the pipe until a leak was detected by the television camera and a target located at a fixed distance from the packer positioned under the leak, then advancing the packer a predetermined distance to place the packer directly over the leak and isolating the leak with the packer and injecting sealing material. This method was illustrated in U.S. Pat. No. 3,168,909 for a method of locating and sealing pipe leaks by James A. Zurbrigen and Jack C. Steinsberger and assigned to the assignee of the present invention.

An improved packer mechanism for use with fast gelling chemical grouts was provided in U.S. Pat. No. 3,103,235 entitled SLEEVE PACKER FOR CHEMICAL GROUTING by Edward Stringam, III and assigned to the assignee of the present invention in which a sleeve type packer was provided having a cylinder covered by an inflatable sleeve and banded at each end and having another band placed over the sleeve and in the middle thereof to provide a packer adapted for fast gelling grouts. One improved packer for use with fast gelling grouts was illustrated in U.S. Pat. No. 3,618,639 entitled PACKER FOR SEALING PIPE LEAKS by Daniel R. Daley and Clark J. Crooker and Thurman Soles and assigned to the assignee of the present invention, which illustrates a packer designed for rapid assembly of standard components and for rapid disassembly for repair or replacement of components. A method and apparatus for more precisely locating leaks in pipes utilizing a packer apparatus is described in U.S. Pat. No. 3,750,711 entitled METHOD AND APPARATUS FOR TESTING FOR LEAKS IN PIPES by James T. Conklin and James B. Rogers and assigned to the assignee of the present invention which packer uses air pressure or air flow fed into the void area in a pipe between the inflated end portions of a packer to detect the leaking pipe joints.

The present invention provides for an improved packer apparatus which is especially useful in smaller sewer lines such as those connecting a sewer line to a building or the like in which difficulty arises in the packer moving around curves in the pipe line. The present invention also provides for a method for locating and repairing pipe lines in which a sealed TV camera is too large to operate in to locate leaks in the pipe.

SUMMARY OF THE INVENTION

Pipe sealing apparatus and method are provided for the internal sealing of pipes. The apparatus includes a pair of inflatable sleeves having a sealing member at each end of each sleeve to form a sealed chamber inside the sleeves. Enclosed chambers in the sleeves are connected to each other by flexible pipe lines. Both sleeves can thereby be inflated simultaneously from a remote location by flexible line connection into one of the sleeves. A flexible connecting member connects one sleeve to the other by connecting one sealing end member on one sleeve to one sealing member on one end of the other sleeve to maintain a predetermined spaced relationship between the sleeves. A flexible chemical line passes through one sleeve and connects with the space between the sleeves for directing settable chemicals into said space when said sleeves are inflated, for sealing a leak in a pipe located between said inflated sleeves. The method of repairing subterranean pipe lines provides for locating a TV camera, along with illuminating means, in a pipe, adjacent an intersection of one pipe with another pipe to view said intersection. Remotely viewing the intersection of the pipes allows the operator to determine if the flow of fluid into the intersection from the other pipe results in a leak in the other pipe. Inserting a packer apparatus into the other pipe and inflating the packer at different points in the pipe allows the operator to determine when the packer is located over a leak in the pipe by the reduction or stopping of the flow of fluid into the intersection and to remotely repair the leak internally with the packer. The other pipe may be stopped up at the point of entrance of the packer to prevent the normal flow of fluids into the intersection.

BRIEF DESCRIPTION OF THE DRAWINGS

Other objects, features and advantages of the invention will be apparent from the written description and the drawings in which.

DESCRIPTION OF THE PREFERRED EMBODIMENTS

Figure 1:
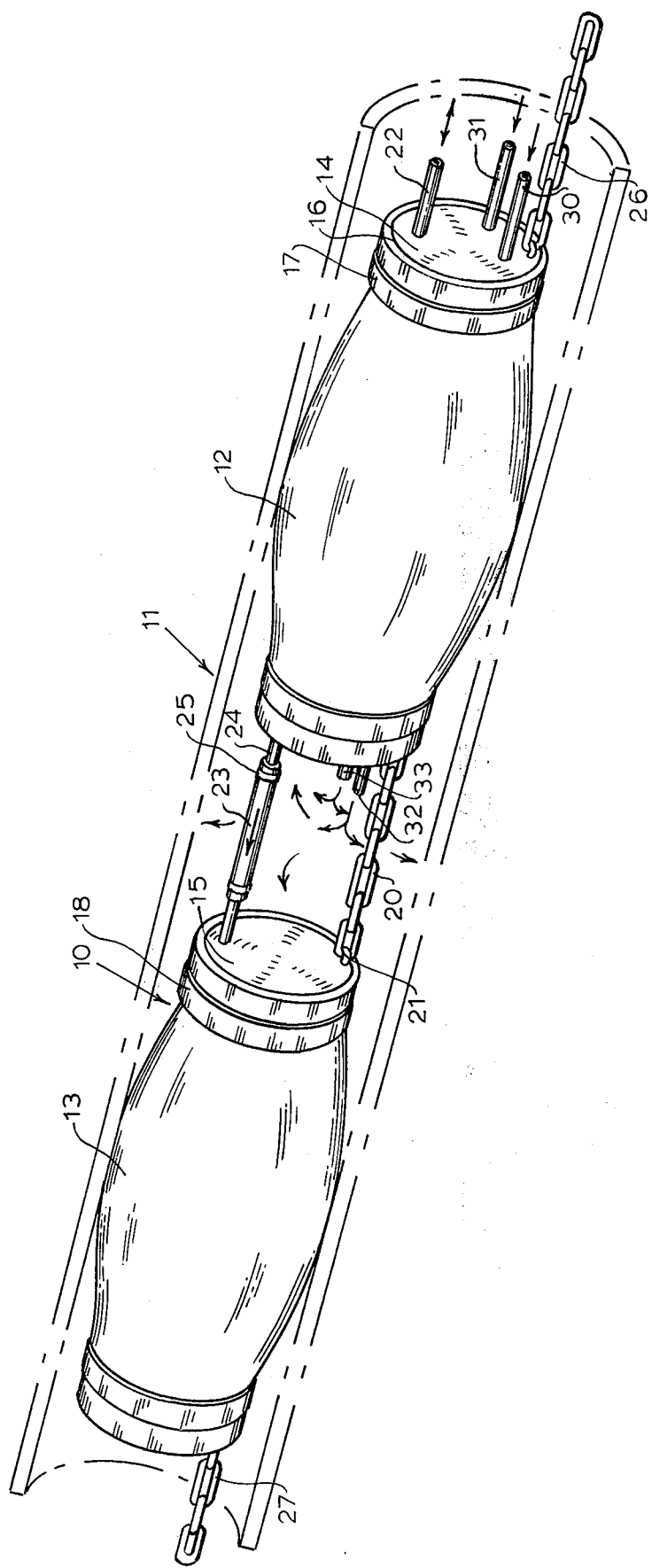
FIG. 1 is a perspective view of a packer in accordance with the present invention illustrated inflated in a cut-away of a sewer line.

FIG. 1 illustrates the packer 10 located in a pipe 11 and having a pair of inflatable sleeves 12 and 13 inflated against the internal surface of the pipe 11. Sleeve 12 has an end sealing member 14 sealing each end of the sleeve 12 and inflatable sleeve 13 has end sealing members 15 sealing each end thereof. Sealing members 14 is attached to inflatable sleeve 12 by being inserted in the end 16 thereof and a metal clamp 17 clamped down onto the sealing member providing an air tight seal. Similarly, end sealing members 15 on sleeve 13 have bands 18 for sealing the sleeve 13 to the end members 15. Packer sleeves 12 and 13 have their facing end members 14 and 15 attached with a flexible chain 20 which chain could of course be a cable, rope or any other flexible piece desired and is attached by an eye 21 located on the end members 14 and 15. Sleeves 12 and 13 with their respective end members 14 and 15 attached thereto form air tight chambers inside which can be filled from a remote location by pipe 22 passing through one end member 14 for directing air or other fluid to expand the sleeve 12 as illustrated in FIG. 1. The flexible pipe 23 connects the chambers inside sleeves 12 and 13 so that both sleeves are inflated simultaneously with the application of fluid pressure through pipe line 22. Flexible tubing 23 is connected to nipples 24 on the two end members by means of bands 25. The use of flexible tubing 23 and of a flexible connecting member 20 allows the packer 10 to move around corners with the mid-portion bending to accomodate the curves in small pipes. Chains 26 connected to end member 14 and chain 27 connected to one end member 15 are passed along the sewer lines to an opening in the sewer line for pulling the packer through the sewer line. A pair of grouting lines 30 and 31 pass through both end members 14 and through the inside of sleeve 12 to form protrusions 32 and 33 located in the spacing between the sleeves 12 and 13. When a leak is located, the packers can be inflated to seal the portion between the sleeves 12 and 13, and grouting chemicals applied through lines 30 and 31 from a remote position above ground. Chemicals pass through the nipples 32 and 33 and fill the spacing as indicated by the arrows in FIG. 1. A continued injection fills the space and forces the chemicals out through the pipe joint leak and into the soil surrounding the pipe 11, sealing the leak. The packer is then deflated and pulled forward leaving the excess chemical grout which has gelled into a plug, between the individual packer sleeves 12 and 13. Packer 10 is then pulled to an opening in the sewer line and the excess chemical grout removed, when necessary. Inasmuch as the packer is being used in small pipes only small quantities of grouting chemicals are needed to fill the area between the sleeves 12 and 13. The separated, inflatable units connected by a flexible connection allows the packer to bend in turning corners in a narrow pipe and also in getting the packer into and out of small sewer lines.

Figure 2:
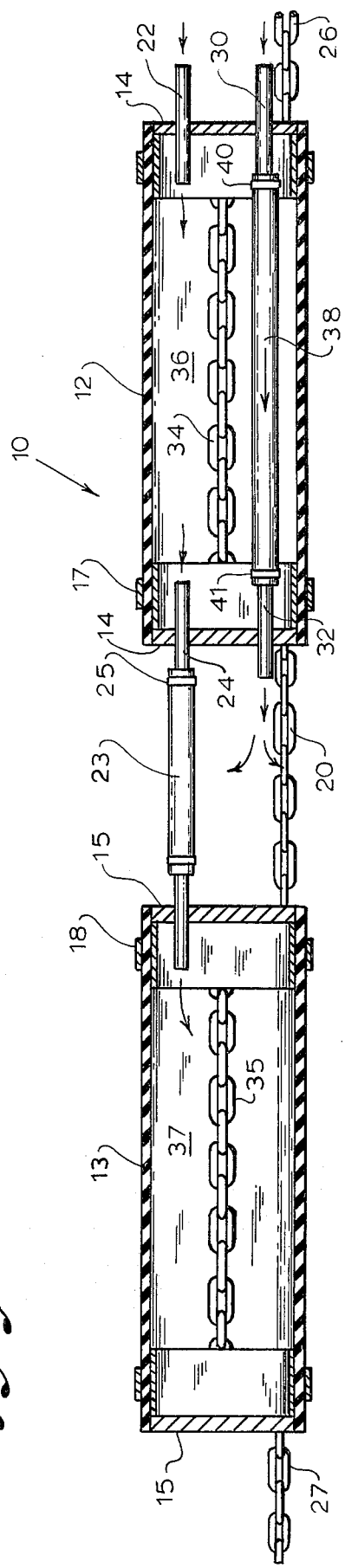
FIG. 2 is a sectional view of a packer in accordance with FIG. 1.
Figure 3:
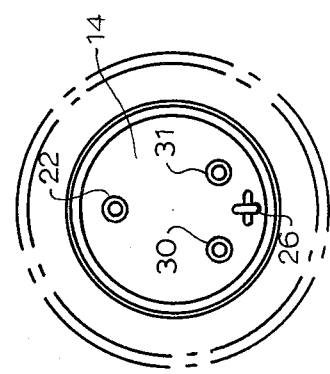
FIG. 3 is an end plan view of the packer in accordance with FIG. 1.

Turning now to FIGS. 2 and 3, the packer 10 is seen having sleeve 12 and sleeve 13 having end sealing members 14 and 15, respectively, which members are connected internally by chains 34 in sleeve 12 and chain 35 in sleeve 13 and steel bands 17 and 18 which seal the sleeves 12 and 13 onto the end pieces 14 and 15. Flexible pipe 23 is also held by clamps 25 to a rigid pipe 24 which allows air to escape from the chamber 36 into the chamber 37 to inflate the sleeves 12 and 13 simultaneously. The air is supplied through line 22 from a remote location. The grouting chemicals are applied through lines 30 and 31 which are connected to a flexible pipe 38 by clamps 40 and to output pipes 32 and 33 by clamps 41. Pipes 32 and 33 pass through a member 14 to the space between facing end members 14 and 15. Flexible chain 20 is also seen connecting end members 14 and 15 and chains 26 and 27 are connected to the opposite end members 14 and 15 for pulling the packer through a pipe. It should be noted at this point that the sleeves 12 and 13 are inflatable and flexible and that chains 34 and 35 are flexible, as well as the pipe 38, so that the packer can follow a curve in a narrow pipe by the bending in the space between facing end members 14 and 15 and by the banding in between the end members 15 and the end members 14.

Figure 4:
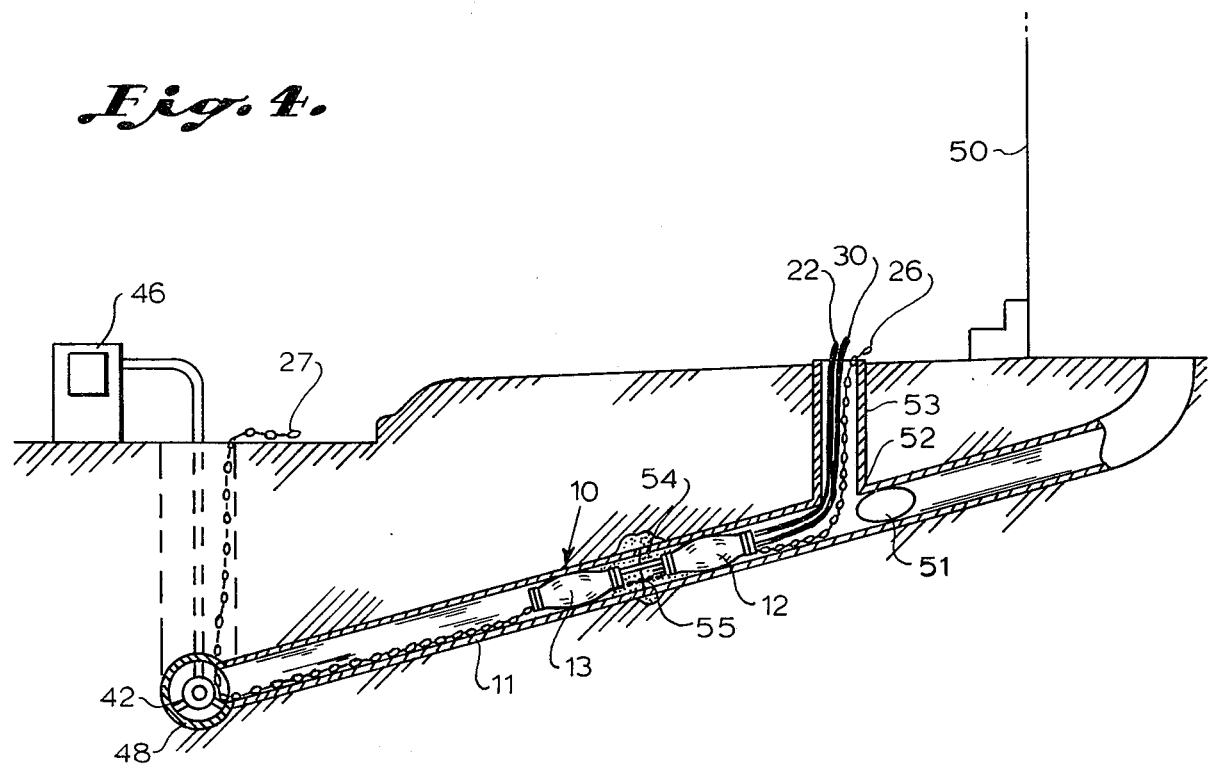
FIG. 4 is a side sectional view of a sewer line connection having a TV camera and a packer located therein in accordance with the present method.
Figure 5:
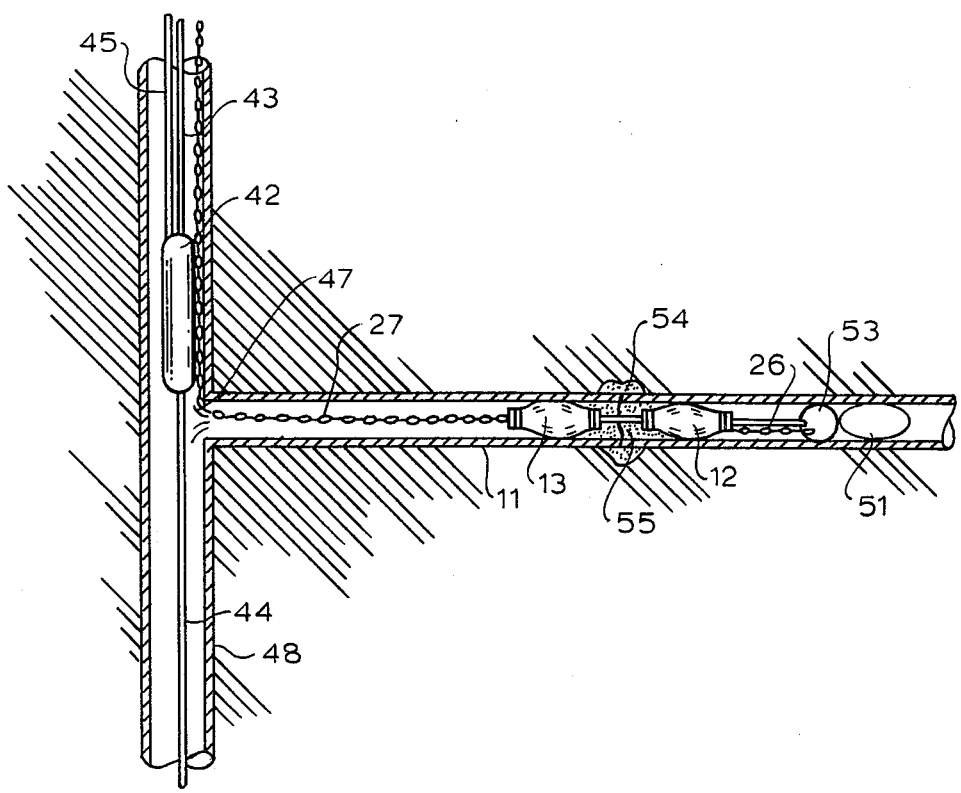
FIG. 5 is a top sectional view of the intersection of a sewer line intersection in accordance with FIG. 4 having the packer and TV camera located therein.

Turning now to FIGS. 4 and 5, a better understanding of the method in accordance with the present invention is seen, in which a sewer line 48 has a television camera 42 located therein by means of cables 43 and 44. Camera 42 is an enclosed, sealed, water-tight camera which carries built-in lights for seeing in air passageways, such as pipes, and is pulled with cable 43 and 44 and has electrical connections 45 connecting the camera to a console unit 46 located above ground. The camera is inserted in an opening to the subterranean sewer line and is pulled back and forth with cables 43 and 44 in positioning the television camera in the correct position for observation at the console unit 46. In the present method the TV camera 42 is located at the intersection 47 of pipe 48 with pipe 11, which might for instance, be the sewer connection for a building 50. The camera 42 can then observe the flow of liquid from pipe 11 into sewer line 48 and if no use is being made of the facilities in the building 50 any fluid flow will be from leaks in the pipe 11. However, it is usually necessary to block the line 11 at some point with an inflatable pipe blocking unit 51 adjacent the intersection 52 of an inlet pipe 53. The inlet pipe 53 typically is provided with a cap which can be removed for entrance to the sewer pipe 11. This top is removed, the line blocked at 51 and the packer 10 inserted into pipe 48 which may be moved backwards and forward by chains 26 and 27 with fluid lines 22 and settable chemical lines 30 and 31 feeding through the subterranean line to the packer 10. Once the stopper 51 is in place, any leakage is from the leaks in the pipe 11 and the packer 10 can be moved along pipe line 11 and inflated at different points. The inflated packer will then block any fluid from leaking and the reduction in fluid flow into pipe 48 at the junction 47 would indicate to the operator at the console 46 the location of the leak, at which point the packer 10 can be adjusted, and the chemicals injected at the leak 54 to seal the leak. The packer 10 may then be removed along with said chemicals 55 located between sleeves 12 and 13. The flexible nature of the packer between inflatable units and of the flexible units allows the packer to enter into narrow pipes 11 and 53 and to turn the sharp corner at the junction 52. This packer is used in conjunction with television camera 42 viewing the intersection joint 47 allows for the internal sealing of connecting lines between buildings and sewer lines without having to excavate the earth from the building to the sewage connection.

This invention, however, is not to be construed as limited to the particular form disclosed herein, since this is to be regarded as illustrative rather than restrictive.

I claim:

1. A pipe leak sealing apparatus for the internal sealing of pipes comprising:
    a pair of spaced inflatable sleeves;
    a plurality of sealing members, one pair of said sealing members being located to seal each end of each inflatable sleeve;
    a flexible spacing member connected between each pair of sealing members on the ends of each inflatable sleeve and being located inside each said sleeve;
    flexible connecting means flexibly connecting one sealing member on one said inflatable sleeve with one sealing member on the other inflatable sleeve thereby spacing said inflatable sleeves in accordance with the length of said flexible connecting means;
    an elongated flexible pulling member, attached to one said sealing member on each inflatable sleeve for pulling said pipe leak sealing apparatus from either end;
    means for directing settable chemicals through said one inflatable sleeve and into the space between said sleeves from a remote location, said means having a pair of flexible pipes passing through said one inflatable sleeve; and
    means for directing a fluid from a remote location into one said inflatable sleeve between its sealing members to inflate said sleeve and a flexible pipe for directing fluid from one inflatable sleeve between its sealing members into the other inflatable sleeve between its sealing members to inflate both inflatable sleeves whereby space in a pipe can be isolated between said inflatable sleeves when inflated and a leak sealed by the application of settable chemicals to said isolated space.

2. The apparatus in accordance with claim 1 in which said flexible connecting means flexibly connecting one sealing member on said inflatable sleeve with one sealing member on the other inflatable sleeve is a flexible chain.

3. The apparatus in accordance with claim 2 in which the flexible spacing member connected between each pair of sealing members of each sleeve is a flexible chain located therein.

4. The apparatus in accordance with claim 3 in which said inflatable sleeves are clamped with metallic clamps to said sealing members.

* * * * *